US006421896B1

(12) United States Patent
Beyer

(10) Patent No.: US 6,421,896 B1
(45) Date of Patent: Jul. 23, 2002

(54) TOOL FOR REMOVING AND REINSTALLING A VALVE

(76) Inventor: Neal (Mitz) K. Beyer, 2225 Rheaume Rd., Manitowoc, WI (US) 54220

( * ) Notice: Subject to any disclaimer, the term of this patent is extended or adjusted under 35 U.S.C. 154(b) by 0 days.

(21) Appl. No.: 09/716,723

(22) Filed: Nov. 20, 2000

(51) Int. Cl.$^{7}$ .................................................. B23P 19/04

(52) U.S. Cl. ............................ 29/213.1; 81/64; 81/3.43

(58) Field of Search ............................ 269/6, 130–132; 81/3.43, 64, 65; 294/22, 19.1; 29/213.1

(56) References Cited

U.S. PATENT DOCUMENTS

| | | | | | |
|---|---|---|---|---|---|
| 20,711 | A | * | 6/1858 | Hopkins | 269/131 |
| 1,816,723 | A | * | 7/1931 | Dunoyer | 269/132 |
| 2,089,902 | A | | 8/1937 | Kulp | |
| 2,268,378 | A | | 12/1941 | Berkman | |
| 2,522,190 | A | * | 9/1950 | Mouser | 294/19.1 |
| 4,912,825 | A | | 4/1990 | Policella | |
| D317,241 | S | | 6/1991 | Lent | |
| 5,349,732 | A | | 9/1994 | Spence | |
| 5,386,856 | A | | 2/1995 | Moody et al. | |
| 6,012,416 | A | * | 1/2000 | Lammers | 294/19.1 |

* cited by examiner

*Primary Examiner*—Robert C. Watson
(74) *Attorney, Agent, or Firm*—Andrus, Sceales, Starke & Sawall, LLP

(57) ABSTRACT

A grasping tool for removing and reinstalling a valve from within a valve guide in an internal combustion engine. The grasping tool includes a securing loop of cable extending from a grasping head. The length of the securing loop can be adjusted such that the valve is entrapped between the securing loop and the grasping head. Specifically, the length of cable that forms the securing loop is fixed at one end relative to the grasping head and includes a locking member attached to a second end to fix the length of the cable between the first end and the locking member. The grasping tool includes a handle movably mounted to an elongated shaft through which the cable passes. The handle is rotatable relative to the elongated shaft to adjust the length of the cable that forms the securing loop.

17 Claims, 3 Drawing Sheets

FIG. 1
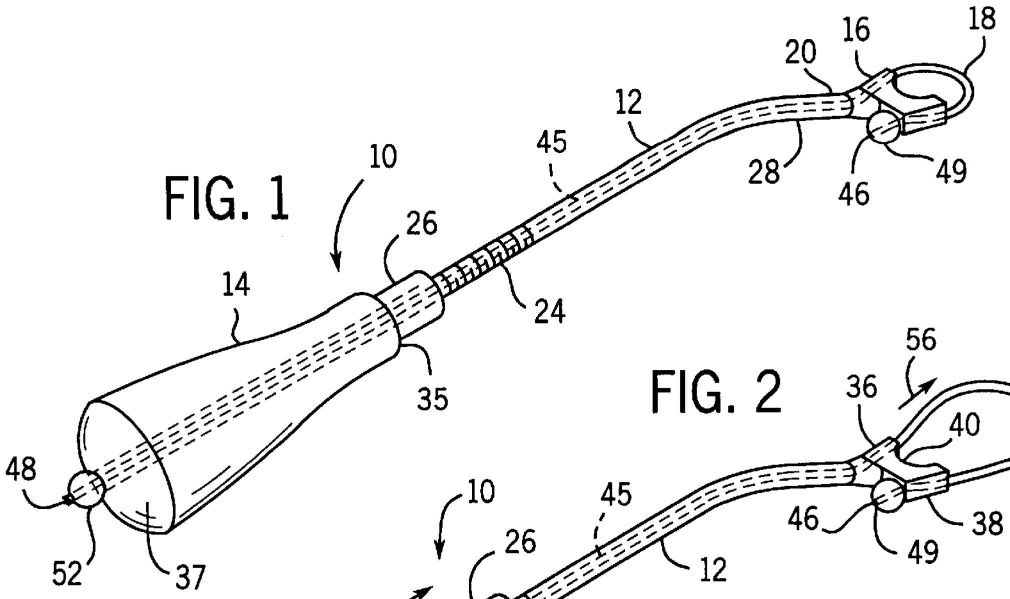
FIG. 2
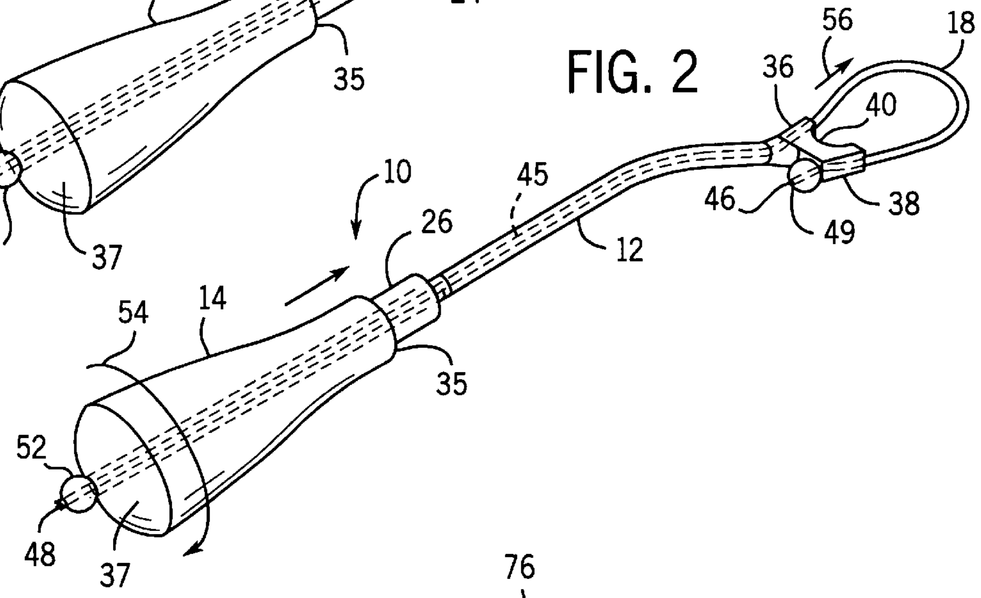
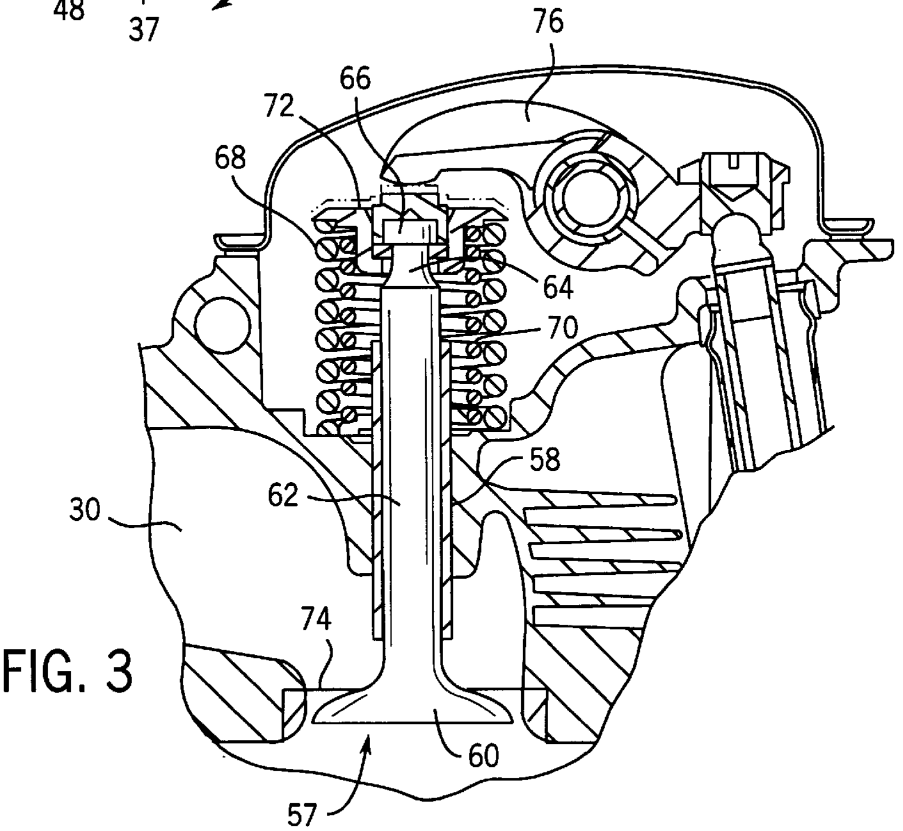
FIG. 3

TOOL FOR REMOVING AND REINSTALLING A VALVE

BACKGROUND OF THE INVENTION

The present invention generally relates to a hand tool for use in the maintenance of an internal combustion engine. More specifically, the present invention relates to a tool for removing and reinstalling a valve from within a valve guide in an aircraft internal combustion engine.

Aircraft engines, like many other types of internal combustion engines, include a valve positioned in each cylinder of the internal combustion engine that opens and closes to provide access to an exhaust port. The exhaust port allows the volume of exhaust gases contained within the cylinder to be discharged after combustion has occurred within the cylinder. Each valve generally includes a valve head connected to an elongated valve stem. The valve stem is guided through its reciprocating movement by a valve guide having an inner diameter slightly larger than the external diameter of the valve stem.

After extended periods of use of an internal combustion engine, airborne carbon particles entrained within the exhaust discharged from the cylinder through the exhaust port begin to build up on the inner diameter of the valve guide. The carbon build up on the inner diameter of the valve guide reduces the tolerance between the valve guide and the valve stem. Eventually, the carbon build up on the inner diameter of the valve guide can cause the exhaust valve to freeze up and no longer function properly. The freeze up of the valve stem within the valve guide can cause the internal combustion engine to malfunction and possibly shut down.

Since complete shut down of an internal combustion engine in an aircraft can have disastrous consequences, the engine manufacturers suggest that the individual valve guide for each cylinder in the internal combustion engine should be cleaned after a predetermined number of hours of operation of the internal combustion engine. For example, some aircraft manufacturers suggest that the valve guides be cleaned after 400 hours of operation of the aircraft engine.

During the maintenance and cleaning of the valve guides, the valve itself must be removed from the valve guide and the inner diameter of the valve guide is cleaned and re-bored by a conventional boring tool. Although the actual maintenance performed on the valve guide is rather simple and quick, a substantial obstacle in cleaning the valve guides is the removal and insertion of the valve from the valve guide prior to and after the cleaning.

Currently, two common methods are used for cleaning the valve guides of an internal combustion engine. The first method requires completely disassembling the engine and removing each valve by pushing the valve into the hollow cylinder of the engine. Once the valve has been removed from the valve guide, a cleaning device can be used to re-bore the valve guide. This type of maintenance on an internal combustion engine can require up to 24 hours of labor, and thus be extremely expensive for the aircraft owner.

Alternatively, a method of cleaning the valve guides has been suggested in which the retainer attached to the end of the valve stem is removed and the entire valve is pushed into the cylinder. Once the valve has been pushed into the cylinder, the valve guide can be bored and cleaned as discussed. After the valve guide has been cleaned, individual finger-like grippers can be used to reach into the cylinder through the exhaust port and grasp the valve within the cylinder. Once grasped, the end of the valve stem must be guided into the opening of the valve guide. However, this method of removing and replacing the valve has proven to be extremely difficult and very time-consuming due to the tedious process of attempting to grasp the valve once it has fallen into the cylinder of the internal combustion engine. In practice, this method of removing and replacing the valve has proven impractical, since it can often require ten or more hours to clean each valve guide of the internal combustion engine.

Therefore, a need exists for an improved method of removing the valve from within the exhaust port of an internal combustion engine without either disassembling the entire engine or requiring the engine mechanic to fish the valve out from within the open cylinder. Further, it is an object of the present invention to provide a tool that can be used to securely grasp the valve prior to the valve being removed completely from the valve guide. Additionally, it is an object of the invention to provide a tool that securely grasps the valve such that the valve can be removed and repositioned within the valve guide without losing positive control of the valve.

SUMMARY OF THE INVENTION

The present invention is a grasping tool for securely holding a valve such that the valve can be removed and reinstalled from within a valve guide. The grasping tool maintains a secure hold on the valve such that the valve can be removed and the valve guide cleaned by appropriate methods. Once the valve guide has been cleaned, the grasping tool can be used to guide the valve back within the valve guide.

The grasping tool of the present invention includes a hollow, elongated shaft extending between a first end and a second end. The hollow, elongated shaft includes an open passageway extending between the first and second ends. The elongated shaft includes an angled section to permit the tool to be inserted into the cylinder through the exhaust port.

A grasping head is attached to the first end of the elongated shaft. The grasping head includes a pair of legs separated by an arcuate contact surface. The arcuate contact surface is configured to receive and engage the outer circumference of the valve being removed.

A handle is movably mounted on the elongated shaft near the second end of the elongated shaft. Specifically, the elongated shaft includes a threaded portion having external threads that are received within an internally threaded mating section formed on the handle. Rotation of the handle about the elongated shaft causes the handle to move along the length of the shaft.

A fixed length cable extends through the combined length of the handle and elongated shaft and an adjustable length portion of the cable forms a securing loop extending from the grasping head. A first end of the cable extends through one of the legs of the grasping head and includes a stop member that prevents the first end of the cable from passing back through the leg of the grasping head. The second end of the cable passes through the opposite leg of the grasping head and is movable relative to the grasping head such that the length of the securing loop extending from the grasping head is adjustable. In the preferred embodiment of the invention, the second end of the cable extends through the combined length of the elongated shaft and handle and extends out past the outer end of the handle. A locking member is attachable to the cable near the outer end of the handle to create a fixed length for the cable between the locking member and the stop member on the first end of the cable.

The grasping tool of the invention can be used to securely grasp the valve stem of a valve that is to be removed from the valve guide to be cleaned. Initially, the length of the securing loop is increased by rotating the handle relative to the elongated shaft. Once the length of the securing loop has been sufficiently increased, the securing loop is passed over the head of the valve such that the valve stem is positioned between the securing loop and the grasping head. The retainer attached to the end of the valve stem can then be removed and the piston contained within the cylinder is moved into contact with the valve head. Once the valve head is supported by the piston, the valve is then pushed from the valve guide until only the end portion of the valve remains within the valve guide. The length of the securing loop is then reduced by rotating the handle relative to the elongated shaft until the valve stem is securely entrapped between the securing loop and the grasping head. Once the securing loop has been sufficiently tightened, the valve can be fully removed from the valve guide.

After the valve guide has been cleaned, the grasping tool can be used to lift the valve back into the valve guide. Once the valve has been reinserted back into the valve guide, the piston is moved back into contact with the valve head to support the valve. Once supported by the piston, the handle of the grasping tool is rotated such that the securing loop is lengthened and the grasping tool is removed from the valve. Once the grasping tool has been removed, the valve can be fully inserted back into the valve guide and the engine returned back to normal operating conditions.

Because of the ability for the grasping tool to tighten very securely around the valve, the grasping tool can be used to remove and reinsert the valve into the valve guide, even though the tolerances between the valve guide and the valve are very small. Additionally, since the valve is always in the control of the engine mechanic, there is little chance that the valve will fall into the cylinder chamber and become lost, thereby requiring complete disassembly of the engine.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 1 is a perspective view of the grasping tool of the present invention for use in removing and reinstalling a valve from an internal combustion engine;

FIG. 2 is a perspective view similar to FIG. 1 illustrating the movement of the handle relative to the elongated shaft to increase the length of the securing loop used to grasp a valve;

FIG. 3 is a partial section view illustrating the operating position of a valve of an internal combustion engine within its valve guide;

DETAILED DESCRIPTION OF THE INVENTION

Figures 4, 5:
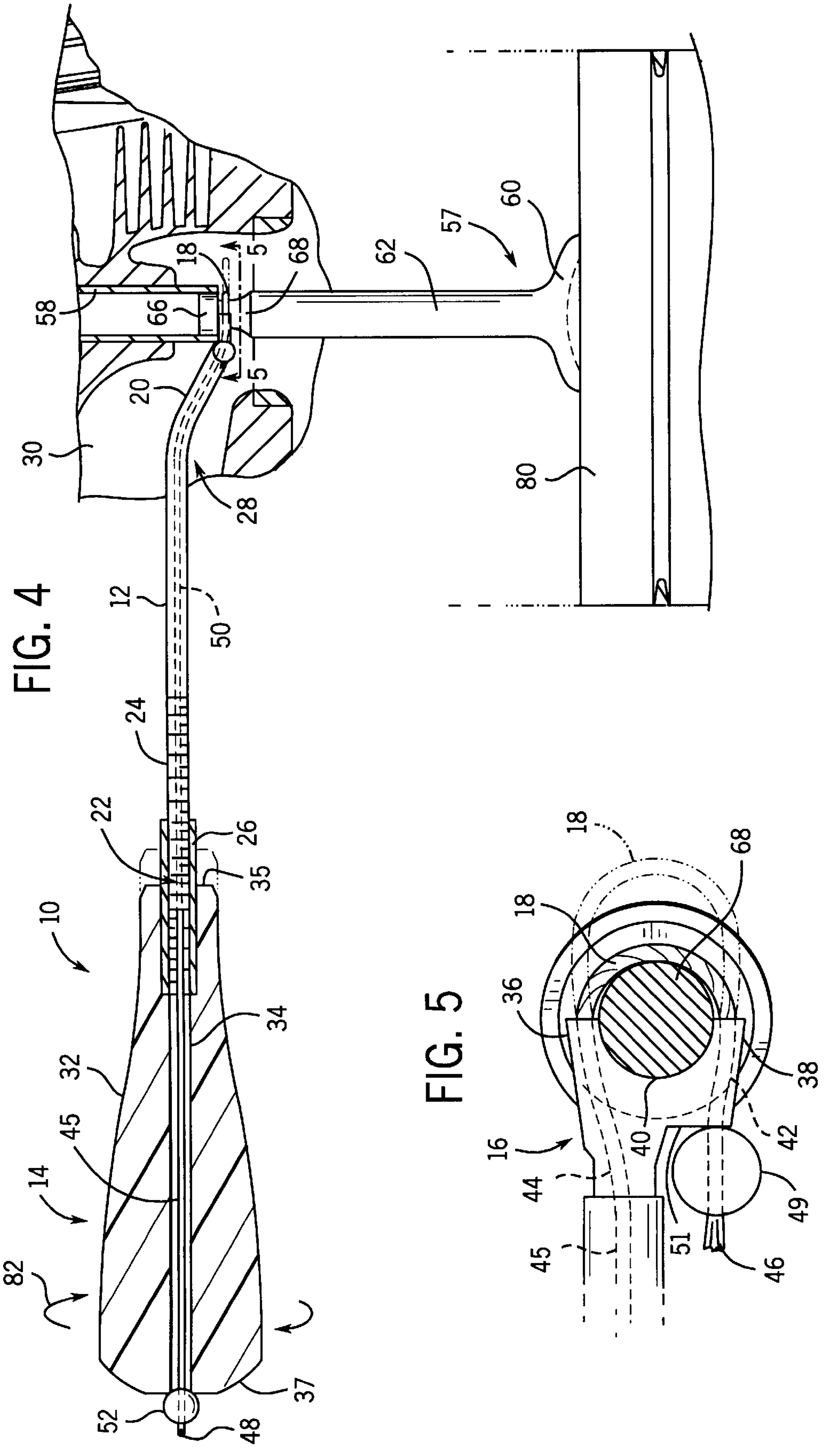
FIG. 4 is a partial section view illustrating the operation of the grasping tool of the present invention to securely hold the valve being removed from an internal combustion engine.
FIG. 5 is a section view taken along line 5—5 of FIG. 4.

Referring first to FIG. 1, thereshown is the grasping tool 10 of the present invention. The grasping tool 10 generally includes an elongated shaft 12 having a handle 14 and a grasping head 16 attached to opposite ends of the shaft 12. The grasping tool 10 further includes a securing loop 18 formed from a portion of a length of cable that extends from the grasping head 16. As can be seen in FIG. 2, the length of the securing loop 18 can be adjusted such that the grasping tool 10 can be used to securely hold objects having varying sizes.

As can be seen in FIGS. 1 and 4, the elongated shaft 12 extends between a first end 20 and a second end 22. The second end 22 of the elongated shaft includes a threaded portion 24 that has a series of external threads formed thereon. The external threads formed on the threaded portion 24 are received within an internally threaded mating section 26 formed on the handle 14. The mating section 26 includes internal threads that correspond with the external threads formed on the threaded portion 24 such that the mating threads allow the handle 14 to be connected to and movable along the length of the elongated shaft 12.

In addition to the threaded portion 24, the elongated shaft 12 includes an angled section 28 that allows the grasping tool 10 to be inserted into the exhaust port 30 of the internal combustion engine, as shown in FIG. 4.

Referring back to FIG. 4, the handle 14 generally includes a body 32 that receives the mating section 26. In the embodiment of the invention illustrated, the body 32 is formed from wood or plastic while the mating section 26 is formed from a metallic material. The body 32 includes an open passageway 34 that extends through the entire length of the body 32 from the inner end 35 to the outer end 37.

Referring now to FIGS. 2 and 5, the grasping head 16 is securely attached to the first end 20 of the elongated shaft 12 and includes a pair of legs 36 and 38. The legs 36 and 38 are separated by an arcuate contact surface 40. The arcuate contact surface 40 has an internal radius generally configured to correspond to the outer diameter of the object to be grasped, as illustrated in FIG. 5. In the preferred embodiment of the invention, the grasping tool 10 is used to grasp the valve of an internal combustion engine. However, it should be understood that the grasping head 16 can be configured to grasp other types of articles.

Referring now to FIG. 5, the leg 38 includes a first cable passageway 42, while the second leg 36 includes a second cable passageway 44. Each of the cable passageways are sized to allow the cable to pass through the grasping head 16 to form the securing loop 18.

As can be seen in FIGS. 1 and 2, the securing loop 18 is formed from a portion of a continuous length of cable 45 extending between a first end 46 and a second end 48. The continuous length of cable 45 includes a stop member 49 attached to its first end 46 such that the first end of the cable is prevented from passing back through the first cable passageway 42, as can be seen in FIG. 5. Specifically, the stop member 49 is sized larger than the first cable passageway 42 and thus contacts the outer edge 51 of the grasping head 16, as shown in FIG. 5.

The length of the cable 45 passes through the first cable passageway 42 and forms the securing loop 18. The cable 45 then passes through the second cable passageway 44 formed in the grasping head 16. From the grasping head, the cable

45 passes through an open passageway 50 extending along the entire length of the elongated shaft 12 from the first end 20 to the second end 22, as seen in FIG. 4. The open passageway 50 formed in the elongated shaft 12 is aligned with the open passageway 34 formed in the handle 14 such that the second end 48 of the cable 45 extends past the outer end 37 of the handle 14.

As can be seen in FIG. 4, the second end 48 of the cable 45 includes a locking member 52. The locking member 52 has an outer diameter greater than the diameter of the open passageway 34 formed in the handle 14, such that the locking member 52 contacts the outer end 37 of the handle 14 to prevent the second end of the cable 45 from passing through the handle 14. In this manner, the locking member 52 fixes the length of the cable between the stop member 49 and the locking member 52.

Although the cable 45 is described in the present invention as being formed from stranded wire, it is contemplated by the inventor that the cable 45 could be replaced by plastic, nylon, rope, or other equivalent material while operating within the scope of the present invention.

As can be understood in FIGS. 1 and 2, when the handle 14 is rotated in the direction indicated by arrow 54, the threaded connection between the handle 14 and the elongated shaft 12 causes the handle 14 to move along the elongated shaft 12 toward the grasping head 16. Movement of the handle 14 toward the grasping head 16 decreases the overall length of the grasping tool 10. As the overall length of the grasping tool 10 decreases, the fixed length of the cable resulting from the interaction between the stop member 49 and the grasping head 16 and the interaction between the locking member 48 and the handle 14 causes the length of the securing loop 18 to increase, as illustrated by arrow 56. If the handle 14 is rotated in the opposite direction, the handle 14 moves along the elongated shaft 12 away from the grasping head 16. Movement of the handle 14 away from the grasping head 16 increases the overall length of the grasping tool, thereby causing the length of the securing loop 18 to decrease. By rotating the handle in this direction, the securing loop 18 can be tightened around any object to be grasped, as will be discussed in greater detail below.

Referring now to FIG. 3, thereshown are representative portions of an internal combustion engine including a valve 57 as shown positioned within a valve guide 58. The valve 57 positioned within the valve guide 58 generally includes a valve head 60 and an elongated valve stem 62. The outer end of the valve stem 62 opposite the valve head 60 includes a reduced diameter neck portion 64 and an end cap 66. As shown in FIG. 3, a pair of valve springs 68 and 70 surround the valve stem 62 and are held in place by a retainer 72. The retainer 72 interacts with the end cap 66 to compress each of the valve springs 68 and 70. The valve springs 68 and 70 exert a bias force on the valve 57 such that the valve head 68 is biased against the exhaust outlet 74. The valve 57 is opened by movement of a rocker arm 76 which depresses the valve 57 against the bias force of the valve springs 68 and 70 and moves the valve head 60 away from the exhaust outlet 74. When the valve 57 is open, exhaust from within the cylinder is evacuated through the exhaust outlet 74 and out of the engine through the exhaust port 30.

As discussed previously, during continued operation of the internal combustion engine, carbon particles create a carbon build up along the inner circumference of the valve guide 58. Since the difference between the inner circumference of the valve guide 58 and the outer diameter of the valve stem 62 is relatively small, build up of carbon along the inner circumference of the valve guide 58 can cause the valve to seize up inside the valve guide 58 and thus cause malfunction of the internal combustion engine. In accordance with the present invention, the grasping tool 10 can be used to remove the valve 57 from within the valve guide 58 such that a cleaning mechanism can be used to clean out the valve guide 58. The method of carrying out this function will now be described.

Referring first to FIG. 2, the handle 14 is rotated in the direction illustrated by arrow 54 to increase the length of the securing loop 18, as illustrated by arrow 56 in FIG. 2. Once the length of the securing loop 18 has been sufficiently increased, the grasping tool 10 is inserted into the exhaust port 30 and the securing loop 18 is placed over the head 60 of the valve.

Once the securing loop 18 has been placed over the head 60 of the valve 57, the retainer 72 is removed from the valve stem 62 and the valve springs 68 and 70 are pulled away from the valve stem 62. With the valve springs 68 and 70, as well as the retaining cap 72, removed, the piston 80 is moved into contact with the valve head 60 to help support the valve 57, as shown in FIG. 4. The piston 80 is moved within the cylinder by manual rotation of the crankshaft, now shown. Once the valve 57 is in contact with the piston 80, the valve 57 is pushed into the interior of the cylinder until only the end cap 66 remains within the valve guide 58, as illustrated in FIG. 4. As can be seen in FIG. 4, the valve head 60 contacts the underside of the piston 80 to aid in supporting the valve 57 as the valve 57 is removed from the valve guide 58.

Once the reduced diameter neck portion 68 has cleared the lower end of the valve guide 58, the securing loop 18 and grasping head 16 are positioned to surround the neck portion 68.

After the grasping head 16 and securing loop 18 are in position, the handle 14 is rotated, as illustrated by arrows 82 in FIG. 4, to move the handle 14 away from the grasping head 16, thus decreasing the length of the securing loop 18. The length of the securing loop 18 is decreased until the neck portion 68 of the valve stem 62 is securely held between the grasping head 16 and the securing loop 18. Specifically, the handle 14 is rotated until the neck portion 68 is pressed into contact with the arcuate contact surface 40. The tightening of the securing loop 18 around the valve stem 62 allows the mechanic utilizing the grasping tool 10 to have a secure hold on the valve 57.

Figure 6:
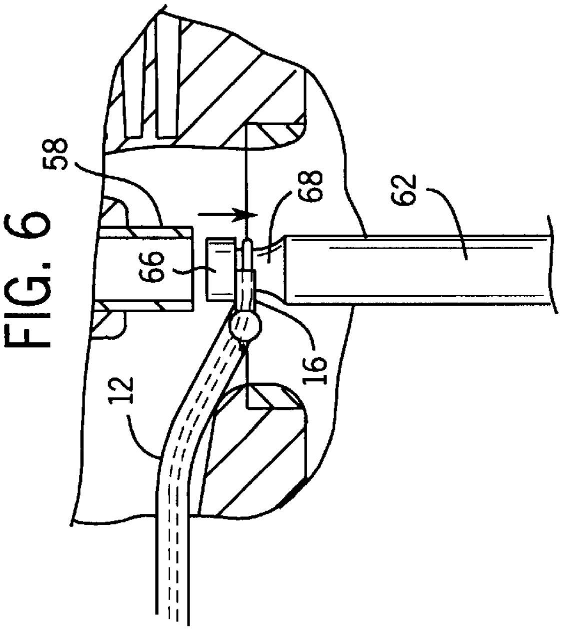
FIG. 6 is an enlarged view illustrating the complete removal of the valve from the valve guide.

Once the securing loop 18 has been tightened, the piston 80 can be backed further away until the end cap 66 of the valve leaves the valve guide 58, as illustrated in FIG. 6. Once the valve has been removed from the valve guide 58, the valve can be moved away from the valve guide 58 to allow the valve guide to be cleaned and re-bored as discussed above.

After the valve guide 58 has been thoroughly cleaned, the grasping tool 10 is used to guide the end cap 66 back into the valve guide 58. Since the valve 57 is securely held by the grasping tool 10, the end cap 66 can be repositioned in the opening for the valve guide 58. Once the end cap 66 is back within the bottom portion of the valve guide 58, the piston 80 is brought back into contact with the valve head 60, as shown in FIG. 4. After the valve 57 is supported as shown, the handle 14 is rotated in the direction opposite to arrow 82 such that the length of the securing loop 18 increases and the neck portion 68 of the valve is released. The length of the securing loop 18 is further increased until the securing loop 18 can freely pass over both the valve stem 62 and the head 60. The valve 57 is then pushed back into the valve guide 58 and the securing loop 18 passes over the valve head 60 to release the valve. After the valve 57 has been released, the valve springs 68 and 70 are reinstalled and the retainer 68 attached, as illustrated in FIG. 3.

Figure 7:
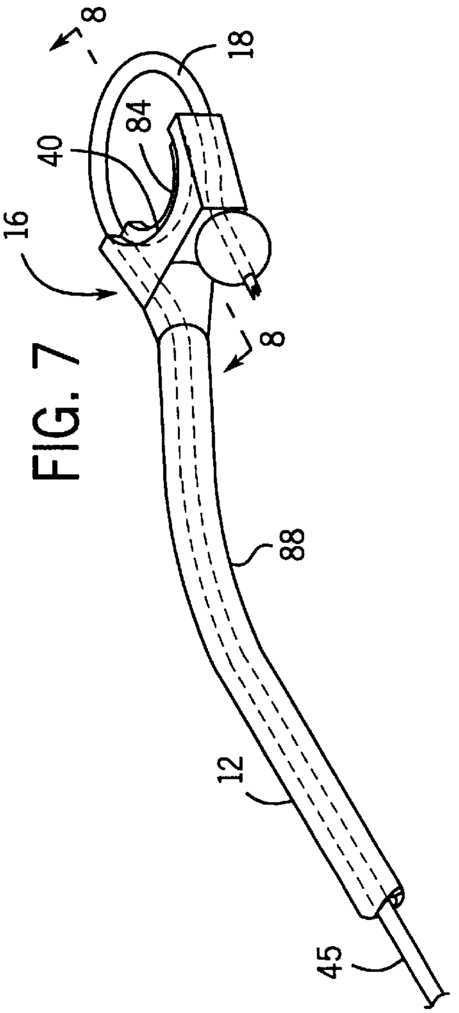
FIG. 7 is a partial perspective view illustrating an alternate embodiment of the invention having a specifically designed grasping head for a particular type of valve.
Figure 8:
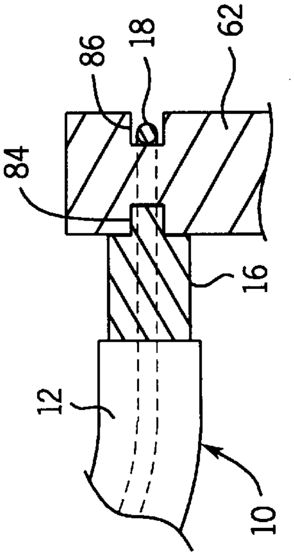
FIG. 8 is a section view taken along line 8—8 of FIG. 7.

Referring now to FIG. 7, thereshown is an alternate embodiment of the grasping head 16 of the present invention. In the embodiment of the invention illustrated in FIG. 7, the grasping head 16 includes a rib 84 protruding from the arcuate contact surface 40. The protruding rib 84 is designed to be received within a notch 86 formed in the valve stem 62 of a specific type of valve assembly utilized by a different aircraft engine manufacturer. As shown in FIG. 8, the rib 84 is seated within the notch 86 and the securing loop 18 used to secure the valve stem 62 to the grasping tool 10. It is contemplated by the inventor that various configurations for the grasping head 16 can be developed depending upon the particular configuration of the valve to be removed. In addition, the angled section 88 of the second embodiment of the invention is configured somewhat differently than the angled section 28 shown in FIG. 1. The second embodiment of the angled section 88 is configured based upon the exhaust outlet for the engine being maintained. Again, it is contemplated by the inventor that various shapes of the angled section 88 are possible, depending upon the particular configuration of the engine being serviced.

Various alternatives and embodiments are contemplated as being within the scope of the following claims particularly pointing out and distinctly claiming the subject matter regarded as the invention.

I claim:

1. A tool for removing and reinstalling a valve from an internal combustion engine, the tool comprising:

a hollow, elongated shaft extending between a first end and a second end, the shaft having an open passageway extending between the first and second ends;

a handle mounted to the first end of the elongated shaft, the handle having an open passageway extending therethrough;

a grasping head mounted to the second end of the elongated shaft, the grasping head being configured to engage the valve; and a securing loop extending from the grasping head, wherein the length of the securing loop is adjustable such that the securing loop entraps the valve between the grasping head and the securing loop;

wherein the securing loop is formed from a portion of a cable extending between a first end and a second end, the first end of the cable being fixed relative to the grasping head and the second end of the cable being movable relative to the grasping head to adjust the length of the securing loop.

2. The tool of claim 1 wherein the open passageway of the elongated shaft is aligned with the open passageway of the handle such that the second end of the cable extends through the aligned open passageways of the handle and the shaft and extends out of the handle.

3. The tool of claim 1 wherein the first end of the cable includes a stop member that contacts the grasping head to fix the first end of the cable relative to the grasping head.

4. The tool of claim 2 further comprising a locking member secured to the cable near the second end of the cable, wherein the locking member engages the handle and fixes the length of the cable between the first end and the locking member.

5. The tool of claim 4 wherein the handle is movable along the length of the elongated shaft, wherein movement of the handle relative to the shaft changes the length of the securing loop extending from the grasping head.

6. The tool of claim 5 wherein the outer diameter of the elongated shaft includes external threads that are received by corresponding internal threads formed on the handle such that rotation of the handle relative to the elongated shaft moves the handle along the length of the elongated shaft.

7. The tool of claim 1 wherein the grasping head includes an arcuate contact surface configured to engage the valve.

8. The tool of claim 7 wherein the grasping head further includes a first cable passageway and a second cable passageway positioned on opposite sides of the contact surface, wherein the first end of the cable passes through the first cable passageway and is fixed relative to the grasping head and the second end of the cable passes through the second cable passageway such that the cable is movable through the second cable passageway to adjust the length of the securing loop.

9. The tool of claim 8 wherein the second cable passageway and the open passageways of both the elongated shaft and the handle are aligned such that the second end of the cable passes through the elongated shaft and the handle and extends from the handle.

10. The tool of claim 9 wherein the handle is movable along the length of the elongated shaft.

11. The tool of claim 9 further comprising a locking member secured to the cable near the second end of the cable, wherein the locking member engages the handle and fixes the length of the cable between the first end and the locking member.

12. The tool of claim 11 wherein the handle is movable along the length of the elongated shaft, wherein movement of the handle relative to the shaft adjusts the length of the securing loop extending from the grasping head.

13. The tool of claim 12 wherein the outer diameter of the elongated shaft includes external threads that are received by corresponding internal threads formed on the handle such that rotational movement of the handle relative to the elongated shaft moves the handle along the length of the elongated shaft.

14. A tool for moving and reinstalling a valve from an internal combustion engine, the tool comprising:

a hollow, elongated shaft extending between a first end and a second end, the shaft having an open passageway extending between the first and second ends, the second end of the elongated shaft having a series of external threads formed thereon;

a handle mounted to the first end of the elongated shaft, the handle having an open passageway extending therethrough that is aligned with the open passageway of the elongated shaft, wherein the handle includes a series of internal threads that engage the external threads formed on the elongated shaft such that rotation of the handle relative to the elongated shaft moves the handle along the length of the elongated shaft;

a grasping head mounted to the second end of the elongated shaft, the grasping head having an arcuate contact surface configured to engage the valve; and a continuous length of cable extending between a first end and a second end, the first end of the cable being fixed relative to the grasping head and the second end of the cable being movable relative to the grasping head, wherein the cable forms a securing loop extending from the grasping head, the length of the securing loop being adjustable by movement of the second end of the cable relative to the grasping head.

15. The tool of claim 14 wherein the grasping head includes a first cable passageway and a second cable passageway positioned on opposite sides of the contact surface, wherein the first end of the cable passes through the first cable passageway and is fixed relative to the grasping head and the second end of the cable passes through the second cable passageway such that the cable is movable through the second cable passageway to adjust the length of the securing loop.

16. The tool of claim 15 wherein the second cable passageway and the open passageway of the elongated shaft and the open passageway of the handle are aligned such that the second end of the cable passes through the elongated shaft and the handle and extends from the handle.

17. The tool of claim 16 further comprising a locking member secured to the cable near the second end of the cable, wherein the locking member engages the handle and fixes the length of the cable between the first end and the locking member such that movement of the handle along the elongated shaft changes the length of the securing loop.

* * * * *